United States Patent
Hong

(10) Patent No.: US 12,291,185 B2
(45) Date of Patent: May 6, 2025

(54) ELECTRONIC BRAKE SYSTEM AND CONTROL METHOD THEREFOR

(71) Applicant: HL MANDO CORPORATION, Gyeonggi-do (KR)

(72) Inventor: Kwangseok Hong, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 389 days.

(21) Appl. No.: 17/789,215

(22) PCT Filed: Dec. 24, 2020

(86) PCT No.: PCT/KR2020/019130
§ 371 (c)(1),
(2) Date: Jun. 27, 2022

(87) PCT Pub. No.: WO2021/133115
PCT Pub. Date: Jul. 1, 2021

(65) Prior Publication Data
US 2023/0029756 A1 Feb. 2, 2023

(30) Foreign Application Priority Data
Dec. 27, 2019 (KR) .................. 10-2019-0176046

(51) Int. Cl.
*B60T 8/40* (2006.01)
*B60T 13/68* (2006.01)
(Continued)

(52) U.S. Cl.
CPC .......... *B60T 8/4081* (2013.01); *B60T 8/4036* (2013.01); *B60T 13/686* (2013.01); *B60T 13/745* (2013.01);
(Continued)

(58) Field of Classification Search
CPC ........ B60T 17/22; B60T 17/221; B60T 17/18; B60T 8/4081; B60T 13/686; B60T 13/745; B60T 2270/402; B60T 2270/406
See application file for complete search history.

(56) References Cited

U.S. PATENT DOCUMENTS 8,659,253 B2 * 2/2014 Satou .................. B62D 5/0484
318/432
8,853,981 B2 * 10/2014 Kojima .................. H02P 25/22
318/400.21
(Continued)

FOREIGN PATENT DOCUMENTS

CN  107005114  8/2017
CN  108422955  8/2018
(Continued)

OTHER PUBLICATIONS

Extended European Search Report dated May 22, 2023 for European Patent Application No. 20905900.5.
(Continued)

*Primary Examiner* — Thomas J Williams
(74) *Attorney, Agent, or Firm* — WOMBLE BOND DICKINSON (US) LLP

(57) ABSTRACT

An electronic brake system includes: a reservoir in which a pressurized medium is stored; a hydraulic pressure supply device comprising a first pressure chamber provided in front of a hydraulic piston and a second pressure chamber provided at a rear of the hydraulic piston, and configured to generate a hydraulic pressure by moving the hydraulic piston forward or backward; a hydraulic control unit configured to control a flow of the hydraulic pressure transferred to a wheel cylinder from the hydraulic pressure supply device; and a controller configured to control the hydraulic pressure supply device and the hydraulic control unit, wherein the hydraulic pressure supply device comprises a (Continued)

motor having a plurality of separate system windings for moving the hydraulic piston, and a control valve configured to open and close a flow path that communicates the first pressure chamber and the second pressure chamber, and when a portion of the plurality of separate system windings of the motor fails, the controller is configured to open the control valve to push the hydraulic piston so that a portion of a hydraulic pressure discharged from a pressure chamber is transferred to another pressure chamber.

13 Claims, 8 Drawing Sheets

(51) Int. Cl.
 B60T 13/74 (2006.01)
 B60T 17/22 (2006.01)
(52) U.S. Cl.
 CPC ....... B60T 17/221 (2013.01); *B60T 2270/402* (2013.01); *B60T 2270/406* (2013.01)

(56) References Cited

U.S. PATENT DOCUMENTS

| | | | | |
|---|---|---|---|---|
| 10,071,717 | B2* | 9/2018 | Kim | B60T 13/686 |
| 10,077,036 | B2* | 9/2018 | Kim | B60T 13/686 |
| 10,513,249 | B2* | 12/2019 | Kim | B60T 13/146 |
| 2002/0100276 | A1* | 8/2002 | Petin | B60T 13/565 |
| | | | | 60/574 |
| 2004/0113575 | A1 | 6/2004 | Matsuoka et al. | |
| 2012/0326492 | A1 | 12/2012 | Mayer | |
| 2013/0234635 | A1 | 9/2013 | Kojima | |
| 2017/0107690 | A1* | 4/2017 | Yamashita | B66C 23/84 |
| 2017/0264178 | A1 | 9/2017 | Stauder et al. | |
| 2017/0327098 | A1* | 11/2017 | Leiber | B60T 13/745 |
| 2019/0181789 | A1* | 6/2019 | Masuda | H02K 7/116 |
| 2023/0029756 | A1* | 2/2023 | Hong | B60T 17/221 |

FOREIGN PATENT DOCUMENTS

| | | |
|---|---|---|
| CN | 110099825 | 8/2019 |
| EP | 2 520 473 | 11/2012 |
| EP | 3 168 096 | 5/2017 |
| JP | 49-81771 | 8/1974 |
| JP | 3875188 | 1/2007 |
| JP | 2008-207679 | 9/2008 |
| JP | 2018-30434 | 3/2018 |
| JP | 6606780 | 11/2019 |
| KR | 10-2012-0031391 | 4/2012 |
| KR | 10-2018-0126258 | 11/2018 |
| KR | 10-2019-0124460 | 11/2019 |
| KR | 10-2021907 | 11/2019 |
| WO | 2018/135710 | 7/2018 |

OTHER PUBLICATIONS

International Preliminary Report on Patentability (Chapter I) issued on Jun. 28, 2022 for PCT/KR2020/019130 and its English Translation from WIPO (now published as WO 2021/133115).
Office Action dated Jun. 20, 2024 for Korean Patent Application No. 10-2019-0176046 and its English translation from Global Dossier.
International Search Report for PCT/KR2020/019130 mailed on Apr. 8, 2021 and its English Translation from WIPO (now published as WO 2021/133115).
Written Opinion of the International Searching Authority for PCT/KR2020/019130 mailed on Apr. 8, 2021 and its English Machine Translation by Google Translate (now published as WO 2021/133115).
Office Action dated Oct. 16, 2023 for Chinese Patent Application No. 202080090469.2 and its English machine translation by Google translate.

* cited by examiner

[FIG. 1]
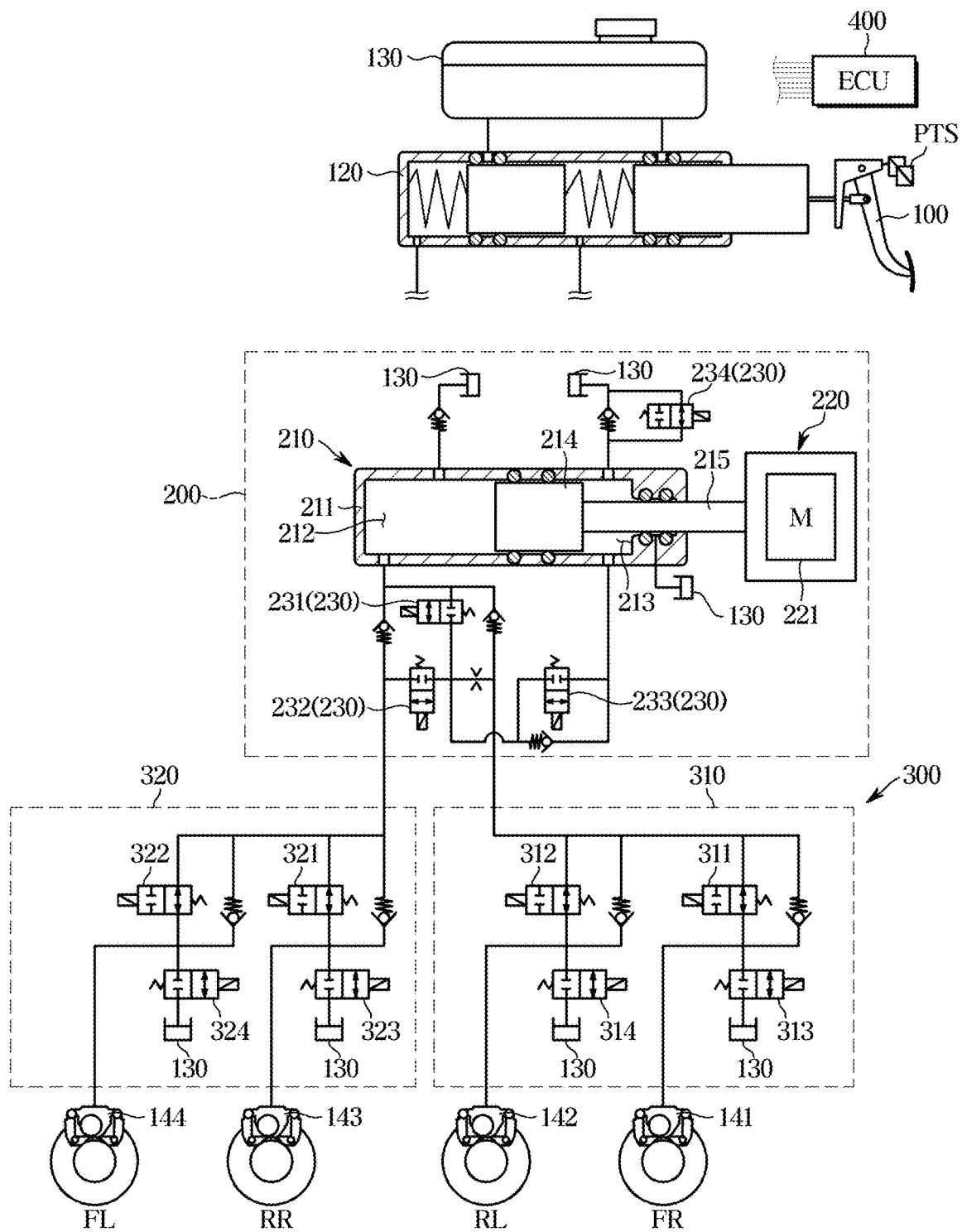

[FIG. 2]
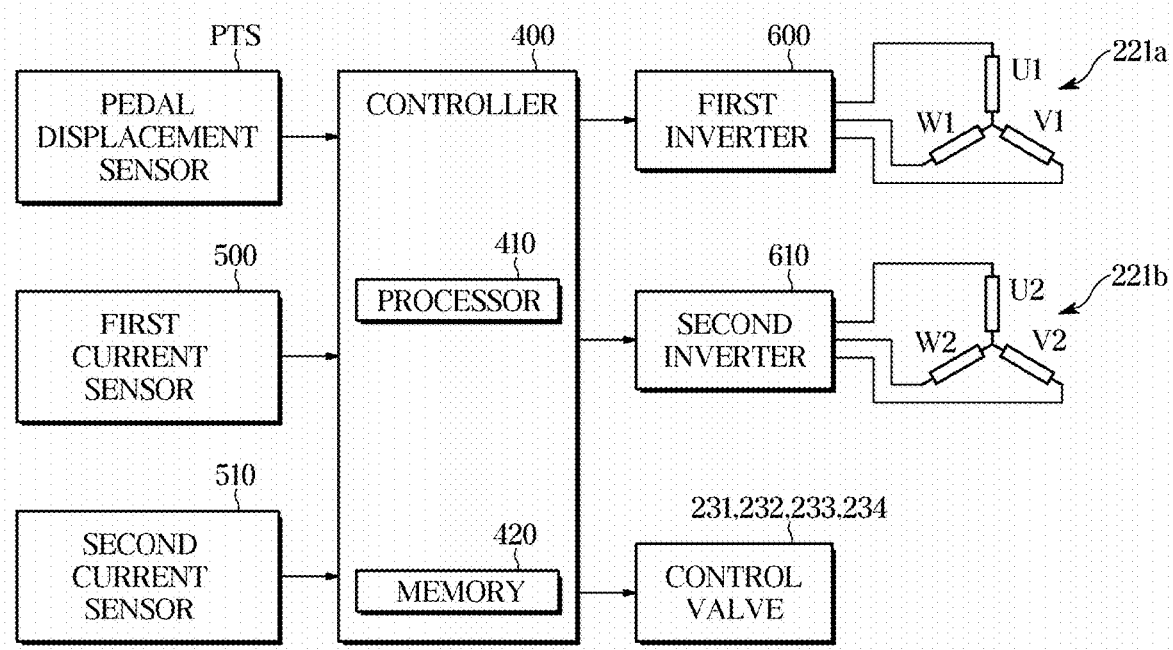

[FIG. 3]
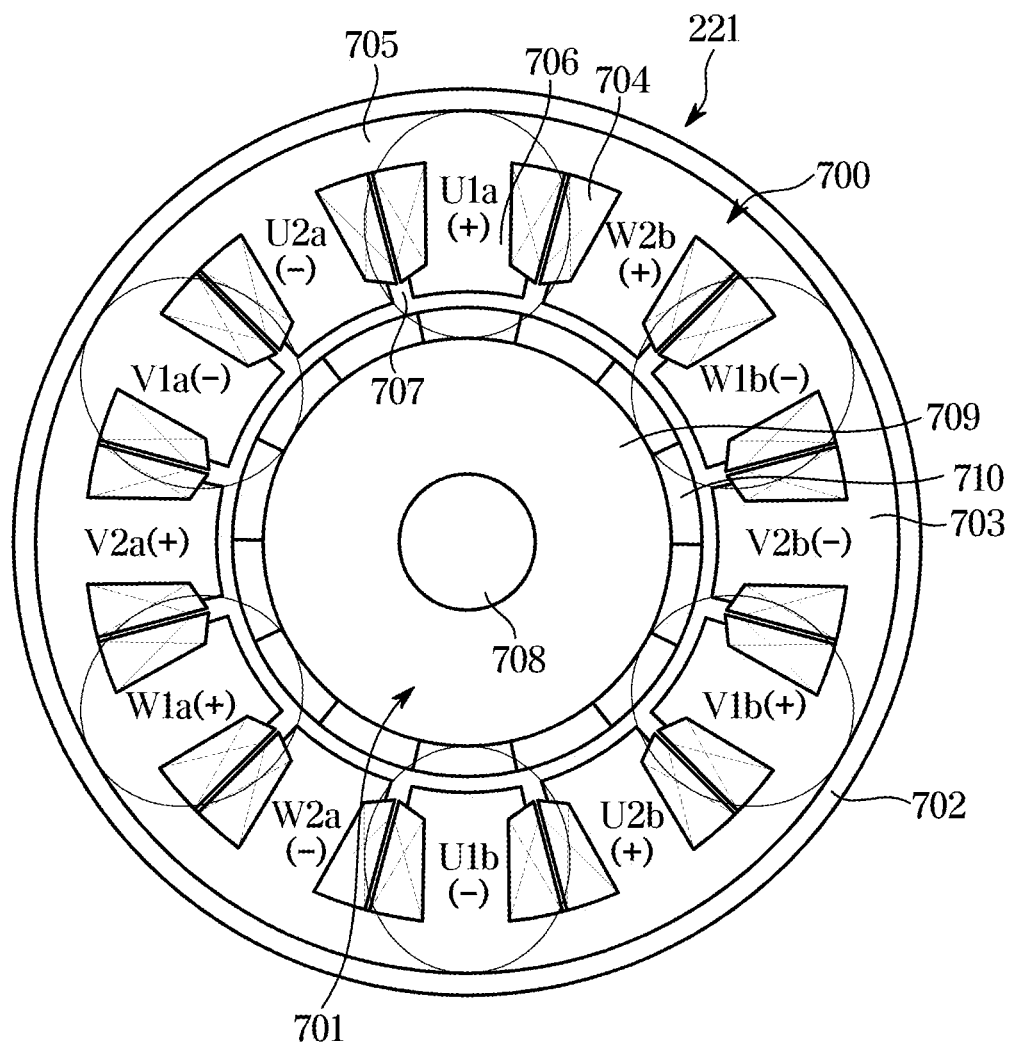

[FIG. 4]
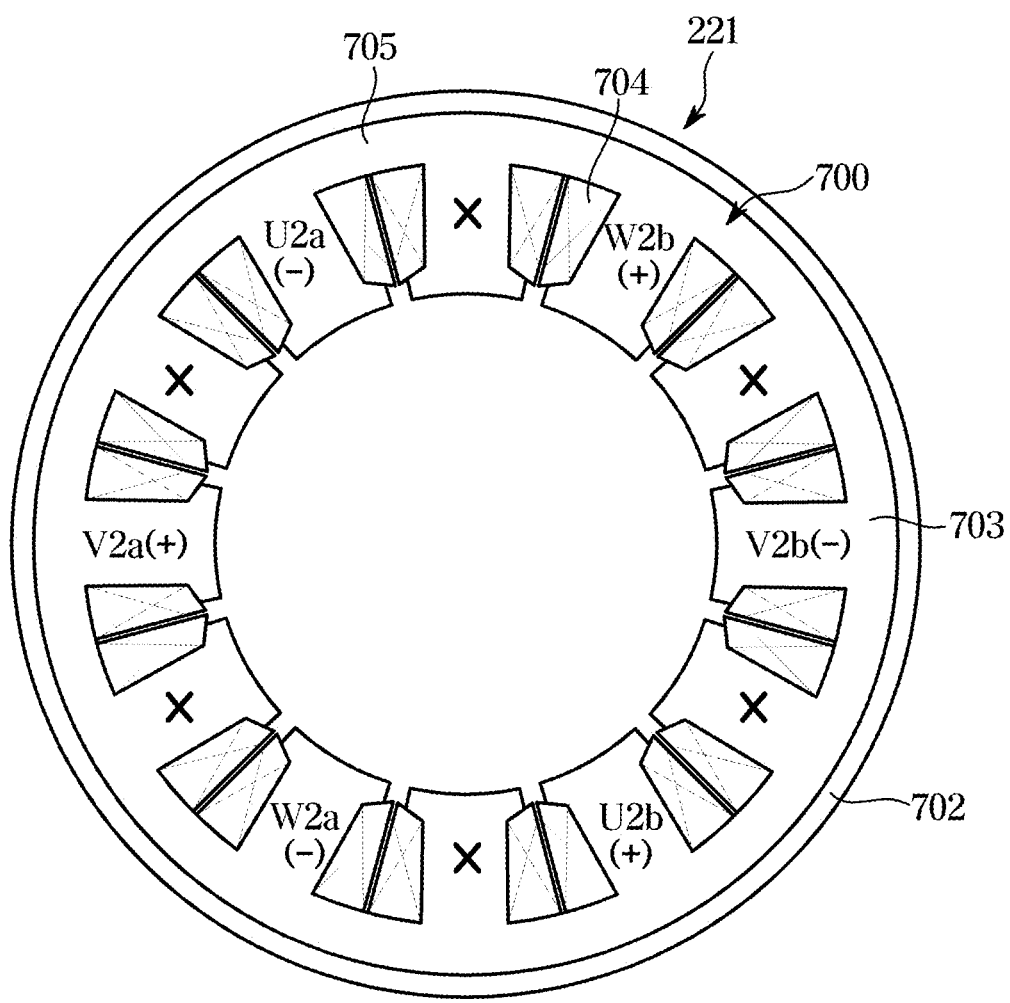

[FIG. 5]
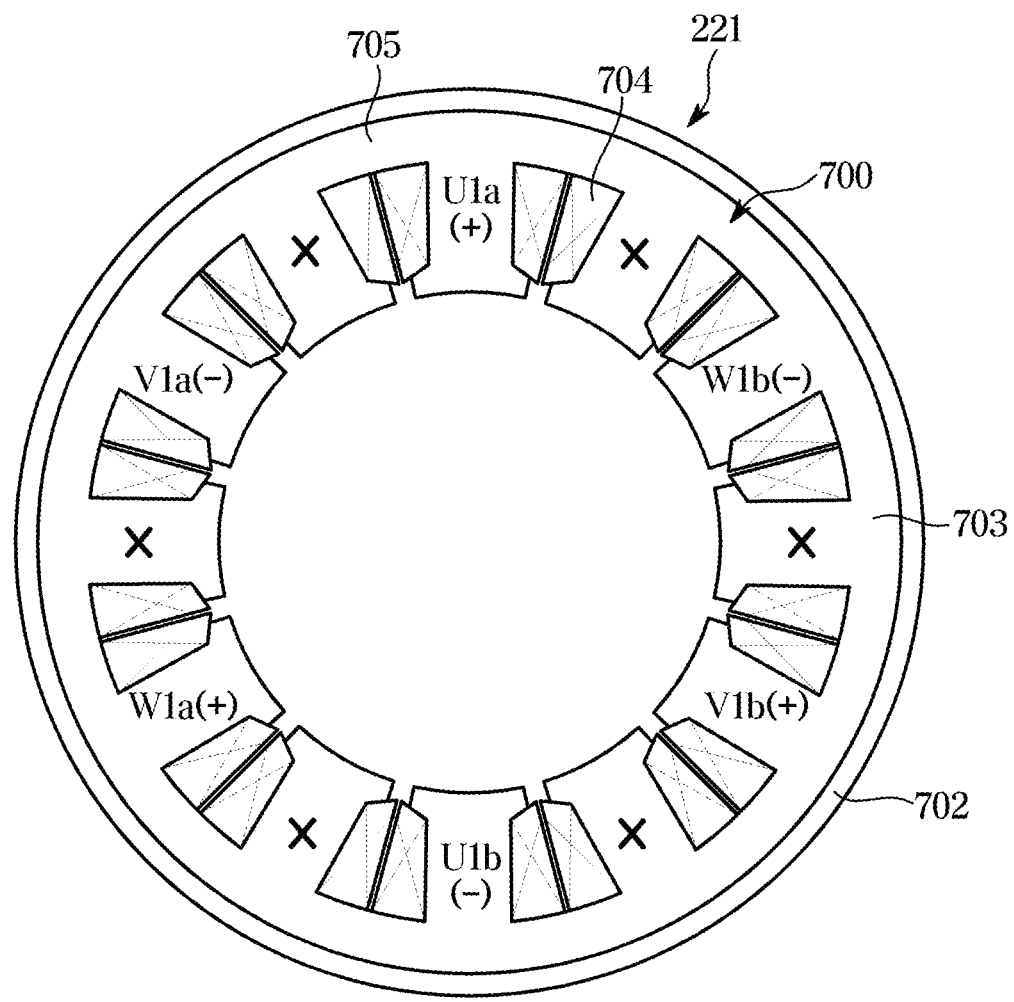

[FIG. 6]
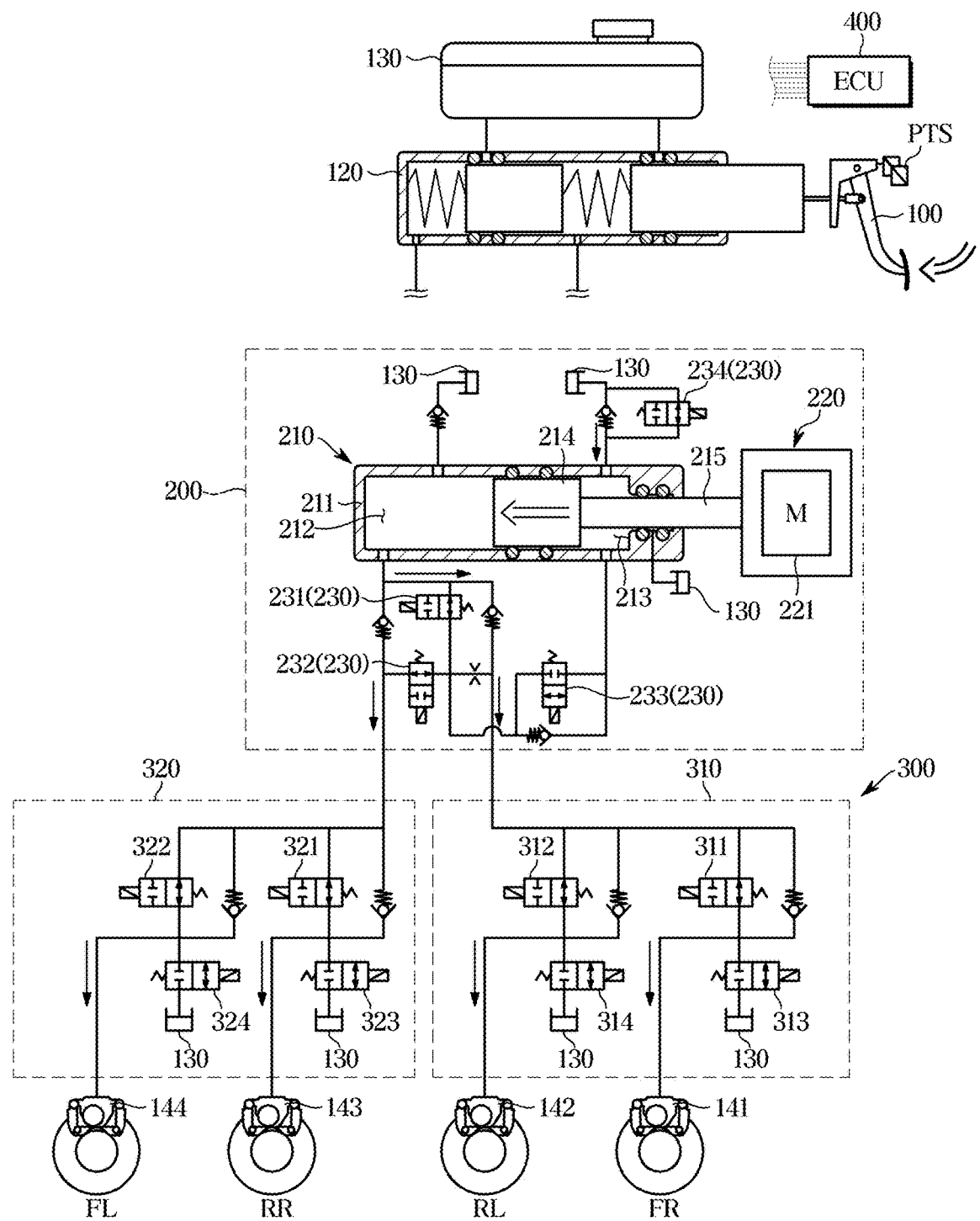

[FIG. 7]
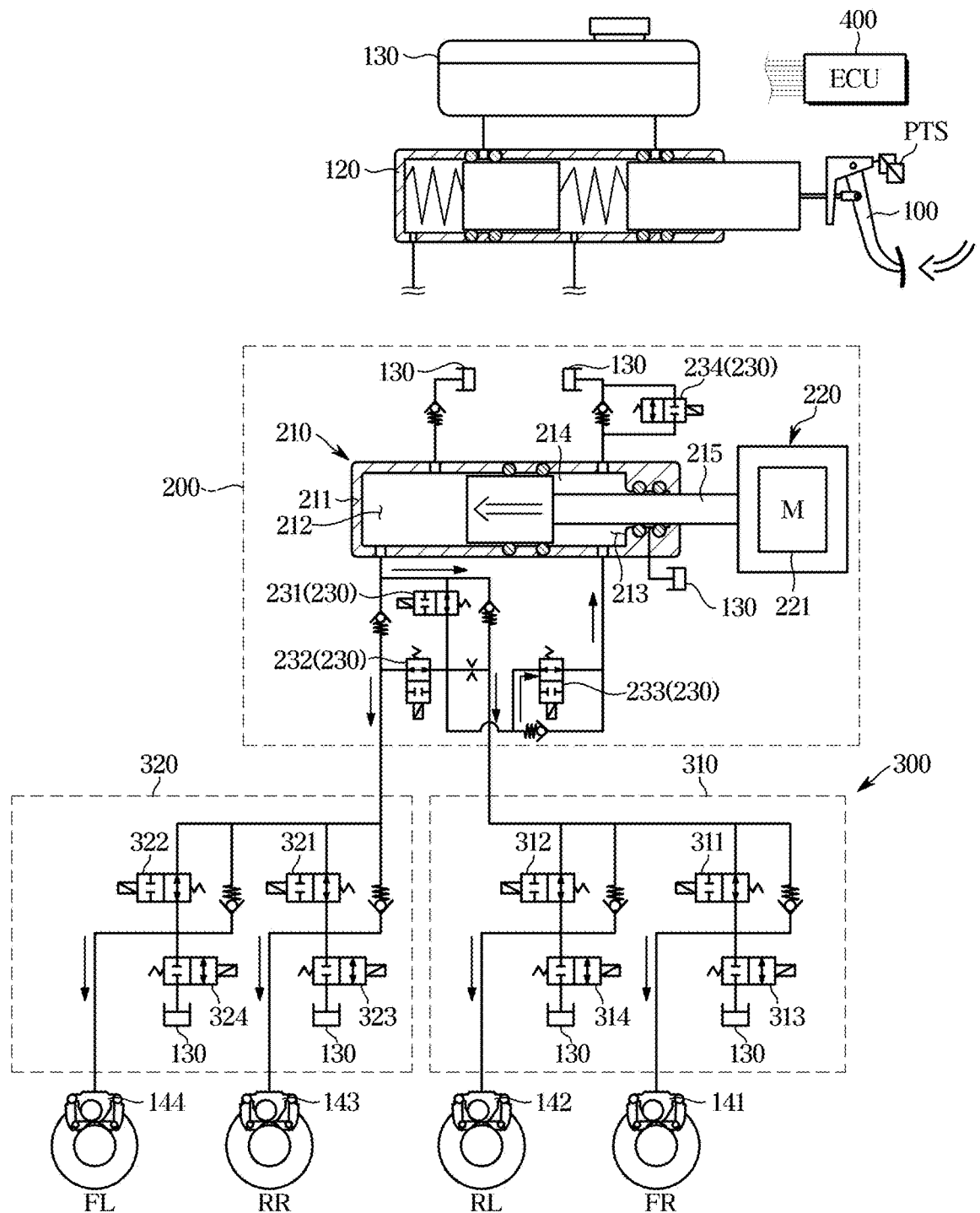

[FIG. 8]
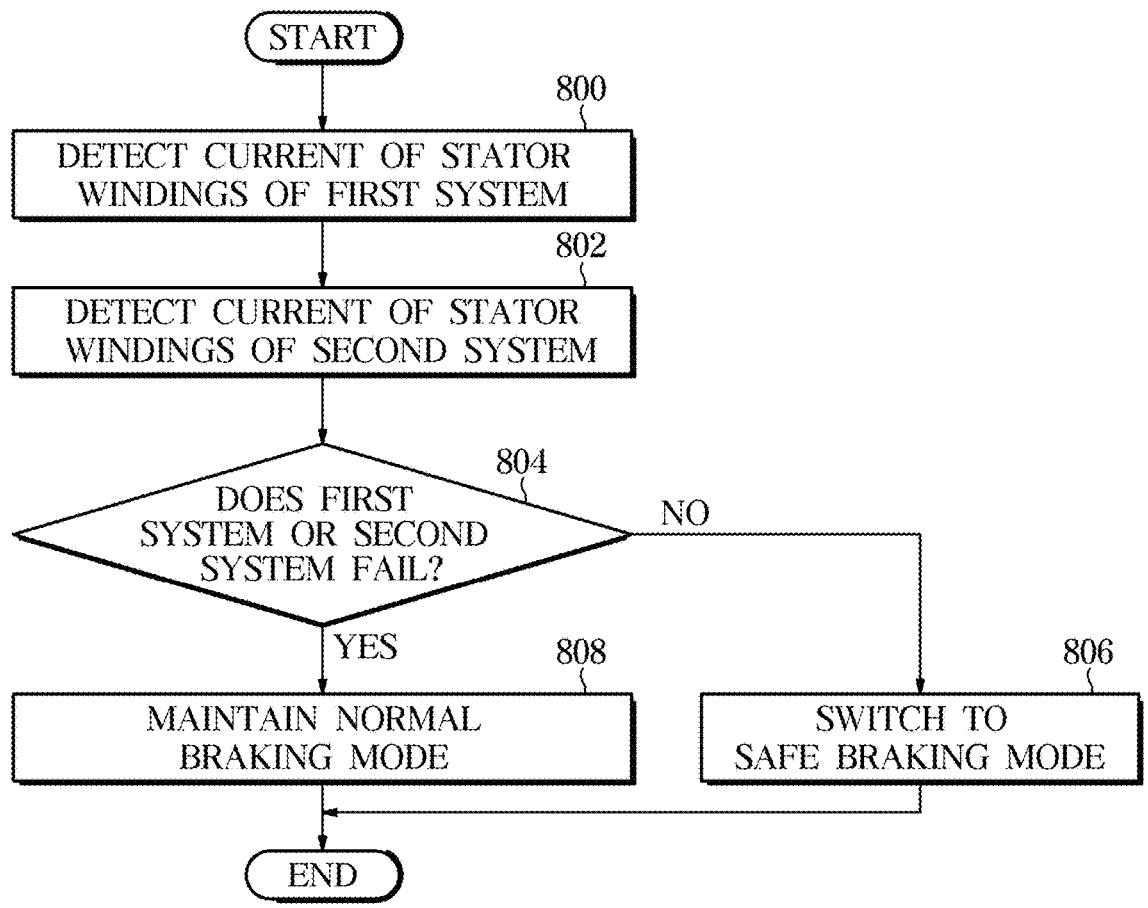

ELECTRONIC BRAKE SYSTEM AND CONTROL METHOD THEREFOR

CROSS-REFERENCE TO RELATED APPLICATIONS

This application is the U.S. National Stage of International Patent Application No. PCT/KR2020/019130 filed on Dec. 24, 2020, which claims the priority to Korean Patent Application No. 10-2019-0176046 filed in the Korean Intellectual Property Office on Dec. 27, 2019, the entire contents of which are incorporated herein by reference.

TECHNICAL FIELD

The disclosure relates to an electronic brake system and a control method thereof, and more particularly, to an electronic brake system and a control method thereof that generate a braking force according to an electrical signal corresponding to a displacement of a brake pedal.

BACKGROUND ART

In general, an electronic brake system may include a hydraulic pressure supply device. Once a driver operates a brake pedal, the hydraulic pressure supply device of the electronic brake system receives an electrical signal indicating the driver's braking intention from a pedal displacement sensor that detects a displacement of the brake pedal, such that the hydraulic pressure is supplied to wheel cylinders.

The electronic brake system provided with the above-described hydraulic pressure supply device has been disclosed in European Registered Patent No. EP 2520473. According to this European Patent document, the hydraulic pressure supply device may generate a hydraulic pressure required for braking and supply the hydraulic pressure to wheel cylinders by operating a motor based on a pedal effort of a brake pedal and changing a position of a piston due to a rotational force of the motor.

An electric motor apparatus disclosed in Japanese Registered Patent No. 3875188 is configured such that an energized system is divided into two independent systems. In a normal state, windings of a first system and a second system cooperate to rotate a rotor. When an error occurs in one of the two systems, the rotor may be rotated only by the winding of the other system. That is, even when one of the two systems fails, the other system is capable of functioning, and thus a fail-safe electric motor may be realized. As such, a separate winding motor is used for vehicle safety.

An electronic brake system requires high safety, since it greatly affects a safety of vehicle. Accordingly, a separate winding motor has been recently employed in an electronic brake system.

In the electronic brake system using the separate winding motor, when an error occurs in one system of a motor, only half of the motor performance is capable of being used. However, because a vehicle driven by the motor is not changed, more current is used to achieve a similar level of performance, causing a risk of excessive motor heat, and the like.

To prevent the above, a larger size motor is required to be designed considering a failure of one of the systems. However, a large motor may lead to a difficulty in packaging and integration with an existing motor.

CITED REFERENCE

Patent Document (Patent Document 1) European Registered Patent No. 2520473 (Published on Nov. 7, 2012)
(Patent Document 2) Japanese Registered Patent No. 3875188 (Registered on Nov. 2, 2006)

DISCLOSURE

Technical Problem

An aspect of the disclosure provides an electronic brake system and a control method thereof that may miniaturize a motor as well as stably secure a braking performance even when a motor performance is reduced.

Technical Solution

According to an aspect of the disclosure, there is provided an electronic brake system including: a reservoir in which a pressurized medium is stored; a hydraulic pressure supply device including a first pressure chamber provided in front of a hydraulic piston and a second pressure chamber provided at a rear of the hydraulic piston, and configured to generate a hydraulic pressure by moving the hydraulic piston forward or backward; a hydraulic control unit configured to control a flow of the hydraulic pressure transferred to a wheel cylinder from the hydraulic pressure supply device; and a controller configured to control the hydraulic pressure supply device and the hydraulic control unit, wherein the hydraulic pressure supply device includes a motor having a plurality of separate system windings for moving the hydraulic piston, and a control valve configured to open and close a flow path that communicates the first pressure chamber and the second pressure chamber, and when a portion of the plurality of separate system windings of the motor fails, the controller is configured to open the control valve to push the hydraulic piston so that a portion of a hydraulic pressure discharged from a pressure chamber is transferred to another pressure chamber.

The motor includes a first system stator winding driven by a first inverter and a second system stator winding driven by a second inverter.

The electronic brake system includes: a first current sensor configured to detect a current supplied to the first system stator winding from the first inverter, and a second current sensor configured to detect a current supplied to the second system stator winding from the second inverter.

The controller is configured to determine a failure of the first system stator winding based on a first system stator winding current detected by the first current sensor, and a failure of the second system stator winding based on a second system stator winding current detected by the second current sensor.

The controller is configured to cut off a current input to a malfunctioning system stator winding.

According to another aspect of the disclosure, there is provided an electronic brake system including: a reservoir in which a pressurized medium is stored; a hydraulic pressure supply device including a first pressure chamber provided in front of a hydraulic piston and a second pressure chamber provided at a rear of the hydraulic piston, and configured to generate a hydraulic pressure by moving the hydraulic piston forward or backward; a hydraulic control unit configured to control a flow of the hydraulic pressure transferred to a wheel cylinder from the hydraulic pressure supply device; and a controller configured to control the hydraulic pressure supply device and the hydraulic control unit, wherein the hydraulic pressure supply device includes a motor having a first system stator winding driven by a first inverter and a second system stator winding driven by a second inverter, and a control valve configured to open and close a flow path that communicates the first pressure chamber and the second pressure chamber, and when the first system stator winding or the second system stator winding fails during a normal braking mode, the controller is configured to switch to a safe braking mode for opening the control valve to push the hydraulic piston, so that a portion of a hydraulic pressure discharged from a pressure chamber is transferred to another pressure chamber.

According to still another aspect of the disclosure, there is provided a control method of an electronic brake system including a reservoir in which a pressurized medium is stored, a hydraulic pressure supply device including a first pressure chamber provided in front of a hydraulic piston and a second pressure chamber provided at a rear of the hydraulic piston and configured to generate a hydraulic pressure by moving the hydraulic piston forward or backward, a hydraulic control unit configured to control a flow of the hydraulic pressure transferred to a wheel cylinder from the hydraulic pressure supply device, and a controller configured to control the hydraulic pressure supply device and the hydraulic control unit, wherein the hydraulic pressure supply device includes a motor having a plurality of separate system windings for moving the hydraulic piston and a control valve configured to open and close a flow path that communicates the first pressure chamber and the second pressure chamber, the control method including: determining whether a portion of the plurality of system windings of the motor fails, and when the portion of the plurality of system windings fails, opening the control valve to push the hydraulic piston, so that a portion of a hydraulic pressure discharged from a pressure chamber is transferred to another pressure chamber.

Advantageous Effects

According to an aspect of the disclosure, an electronic brake system and a control method thereof can miniaturize a motor as well as stably secure a braking performance even when a motor performance is reduced due to a partial failure of the motor.

DESCRIPTION OF DRAWINGS

FIG. 1 is a hydraulic circuit diagram illustrating an electronic brake system according to an embodiment.

FIG. 2 illustrates a configuration of a motor of an electronic brake system according to an embodiment.

FIG. 3 is a control block diagram illustrating an electronic brake system according to an embodiment.

FIG. 4 illustrates a failure of a first system of a motor of an electronic brake system according to an embodiment.

FIG. 5 illustrates a failure of a second system of a motor of an electronic brake system according to an embodiment.

FIG. 6 illustrates a state where an electronic brake system according to an embodiment performs a normal braking mode.

FIG. 7 illustrates a state where an electronic brake system according to an embodiment performs a safe braking mode.

FIG. 8 illustrates a control method of an electronic brake system according to an embodiment.

FIG. 9 is a hydraulic circuit diagram illustrating an electronic brake system according to another embodiment.

FIG. 10 illustrates a state where an electronic brake system according to another embodiment performs a normal braking mode.

FIG. 11 illustrates a state where an electronic brake system according to another embodiment performs a safe braking mode.

BEST MODE OF THE DISCLOSURE

Like reference numerals throughout the specification denote like elements. Also, this specification does not describe all the elements according to embodiments of the disclosure, and descriptions well-known in the art to which the disclosure pertains or overlapped portions are omitted. The terms such as "-part", "-member", "-module", "-block", and the like may refer to at least one process processed by at least one hardware or software. According to embodiments, a plurality of "-part", "-member", "-module", "-block" may be embodied as a single element, or a single of "-part", "-member", "-module", "-block" may include a plurality of elements.

It will be understood that when an element is referred to as being "connected" to another element, it can be directly or indirectly connected to the other element, wherein the indirect connection includes connection via a wireless communication network.

It will be understood that the term "include" when used in this specification, specifies the presence of stated elements, but do not preclude the presence or addition of one or more other elements.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a hydraulic circuit diagram illustrating an electronic brake system according to an embodiment.

Referring to FIG. 1, the electronic brake system may include a master cylinder 120 that pressurizes and discharges a pressurized medium accommodated therein by an operation of a brake pedal 100, a reservoir 130 which is connected to a upper side of the master cylinder 120 and stores the pressurized medium, wheel cylinders 140 provided in respective wheels RR, RL, FR and FL, a hydraulic pressure supply device 200 operated by an electrical signal corresponding to a displacement of the brake pedal 100 to generate a hydraulic pressure and supply the generated hydraulic pressure to each of the wheel cylinders 140 provided in the respective wheels RR, RL, FR and FL, and a hydraulic control unit 300 that controls a flow of the hydraulic pressure transferred to each of the wheel cylinders 140 by the hydraulic pressure supply device 200.

The hydraulic pressure supply device 200 may be provided to receive an electrical signal corresponding to a driver's braking intention from a pedal displacement sensor (PTS) detecting a displacement of the brake pedal 100 and generate a hydraulic pressure of the pressurized medium through a mechanical operation.

The hydraulic pressure supply device 200 may include a hydraulic pressure providing unit 210 that provides a pressure of the pressurized medium transferred to each of the wheel cylinders 140, a motor-driven actuator 220 that operates the hydraulic pressure providing unit 210 using a motor 221, and a plurality of control valves 230 that control the flow of the hydraulic pressure.

The hydraulic pressure providing unit 210 may include a cylinder block 211 provided to accommodate the pressurized medium, a hydraulic piston 214 accommodated in the cylinder block 211, and a drive shaft 215 that transfers power output from the motor-driven actuator 220 to the hydraulic piston 214. The cylinder block 211 may include a first pressure chamber 212 positioned in front of the hydraulic piston 214 and a second pressure chamber 213 positioned at a rear of the hydraulic piston 214.

The plurality of control valves 230 may include first to fourth control valves 231, 232, 233 and 234.

The first to third control valves 231, 232 and 233 may control a flow of the pressurized medium transferred to the hydraulic control unit 300 from the first pressure chamber 212 and/or the second pressure chamber 213 or a flow of the pressurized medium between the first pressure chamber 212 and the second pressure chamber 213, by a formation of flow paths depending on an opening and closing of valves. For example, the first to third control valves 231, 232 and 233 may be provided as a normally closed type solenoid valve that operates to be open when an on-driving signal is received from a controller 400 in a normally closed state.

The fourth control valve 234 may control a flow of the pressurized medium between the second pressure chamber 213 and the reservoir 130. For example, the fourth control valve 234 may be provided as a normally open type solenoid valve that operates to be closed when an on-driving signal is received from the controller 400 in a normally open state.

Types and the number of the plurality of control valves 230 may vary depending on a structure of flow paths.

The hydraulic pressure supply device 200 may include a motor pump or a high pressure accumulator instead of the hydraulic pressure providing unit 210 and the motor-driven actuator 220.

The hydraulic control unit 300 may include a first hydraulic circuit 310 that controls the flow of the pressurized medium transferred to first and second wheel cylinders 141 and 142 among the four wheel cylinders, and a second hydraulic circuit 320 that controls the flow of the pressurized medium transferred to third and fourth wheel cylinders 143 and 144.

For example, the first hydraulic circuit 310 may control a braking force of the front right wheel FR and the rear left wheel RL. The second hydraulic circuit 320 may control a braking force of the rear right wheel RR and the front left wheel FL.

The hydraulic control unit 300 may include an inlet valve provided at a front end of each of the wheel cylinders 141, 142, 143 and 144 to control the hydraulic pressure, and an outlet valve branched between the inlet valve and the wheel cylinders 141, 142, 143 and 144 and connected to the reservoir 130. The hydraulic pressure supply device 200 and a front end of the inlet valve of the first hydraulic circuit 310 may be connected to each other, and the hydraulic pressure supply device 200 and a front end of the inlet valve of the second hydraulic circuit 320 may be connected to each other. The hydraulic pressure generated and provided from the hydraulic pressure supply device 200 may be supplied to each of the first hydraulic circuit 310 and the second hydraulic circuit 320.

FIG. 2 illustrates a configuration of a motor of an electronic brake system according to an embodiment.

Referring to FIG. 2, the motor 221 may include a stator 700 disposed outside and a rotor 701 disposed inside.

The stator 700 may include a housing 702, a stator core 703 fixed to an inner circumferential side of the housing 702, and three-phase (U, V, W) stator windings (coil) 704 wound on the stator core 703.

In the stator core 703, a yoke portion 705 and a plurality of teeth 706 protruding inward from the yoke portion 705 may be formed. For example, twelve teeth 706 may be provided in the motor 221. A slot 707 may be formed between each of the teeth 706. The motor 221 may have twelve slots 707. The stator winding 704 wound around the tooth 706 may be accommodated in the slot 707.

The rotor 701 may be positioned inside of the stator 700. The rotor 701 may include a rotation shaft 708, a rotor core 709 and a magnet 710. The rotation shaft 708, the rotor core 709 and the magnet 710 may be disposed on a same axis.

The rotor core 709 may be disposed around the rotation shaft 708. The magnet 710 is fixed around an outer circumference of the rotor core 709. Fourteen magnets 710 are disposed along the outer circumference of the rotor core 709. The motor 221 may be a motor having fourteen poles and twelve slots.

The motor 221 may be driven by two independent energized systems.

The stator windings 704 of the motor 221 may be divided into two independent systems and wired.

The numbers 1 and 2 after U, V and W shown in FIG. 2 indicate a system (a first system or a second system) to which the stator winding 704 belongs.

The stator windings 704 of the first system may be connected in a Y configuration. The stator windings 704 of the second system may also be connected in a Y configuration.

The stator windings 704 of the two systems may be alternately arranged in a circumferential direction. Inphase windings of the same system may be arranged to face each other. The stator windings of the first system (first group three-phase coils) and the stator windings of the second system (second group three-phase coils) of the stator windings 704 may be alternately arranged in an order of U1$a$(+), W2$b$(+), W1$b$(−), V2$b$(−), V1$b$(+), U2$b$(+), U1$b$(−), W2$a$ (−), W1$a$(+), V2$a$(+), V1$a$(−) and U2$a$(−).

FIG. 3 is a control block diagram illustrating an electronic brake system according to an embodiment.

Referring to FIG. 3, the electronic brake system may include the controller 400 that performs an overall control.

The controller 400 is electrically connected to a pedal displacement sensor (PTS), a first current sensor 500, a second current sensor 510, a first inverter 600, a second inverter 610 and the control valves 231, 232, 233 and 234.

The pedal displacement sensor (PTS) may detect an operation and a displacement of the brake pedal 100.

The first current sensor 500 may detect current supplied from the first inverter 600 to stator windings (221*a*: U1, V1 and W1) of a first system of the motor 221.

The second current sensor 510 may detect current supplied from the second inverter 610 to stator windings (221*b*: U2, V2 and W2) of a second system of the motor 221.

The first inverter 600 may supply current to the stator windings (U1, V1 and W1) of the first system of the motor 221.

The second inverter 610 may supply current to the stator windings (U2, V2 and W2) of the second system of the motor 221.

The first inverter 600 and the second inverter 610 may drive the motor 221 by converting a DC voltage provided from a battery of a vehicle into a three-phase AC voltage in a form of a pulse having an arbitrary variable frequency through pulse width modulation (PWM). The first inverter 600 and the second inverter 610 may include a plurality of power switching elements and a plurality of diodes. For example, each of the first inverter 600 and the second inverter 610 may include six power switching elements Q1 to Q6 and six diodes D1 to D6. The six power switching elements Q1 to Q6 may be paired in series and connected to the stator windings (U1, V1 and W1) of the first system of the motor 221 or the stator windings (U2, V2 and W2) of the second system of the motor 221, respectively. The first inverter 600 and the second inverter 610 may convert the current, provided from the battery, to AC from DC by turning on or off each of the power switching elements according to a control signal of the controller 400, thereby supplying the current to the stator windings (U1, V1 and W1) of the first system of the motor 221 and/or the stator windings (U2, V2 and W2) of the second system of the motor 221.

The controller 400 may perform an overall control of the electronic brake system.

The controller 400 may control the hydraulic pressure supply device 200 and the hydraulic control unit 300.

The controller 400 may be referred to as an electronic control unit (ECU).

The controller 400 may include a processor 410 and a memory 420.

The memory 420 may store a program for processing or controlling the processor 410 and various data for operating the electronic brake system.

The memory 420 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The processor 410 may control overall operations of the electronic brake system.

The processor 410 may receive brake pedal displacement information through the pedal displacement sensor (PTS).

The processor 410 may receive current information of the stator windings (U1, V1 and W1) of the first system detected through the first current sensor 500.

The processor 410 may receive current information of the stator windings (U2, V2 and W2) of the second system detected through the second current sensor 510.

The processor 410 may diagnose the current information of the stator windings (U1, V1 and W1) of the first system, detected through the first current sensor 500, and thereby may determine whether a temporary failure or permanent failure such as disconnection or short circuit occurs in the stator windings (U1, V1 and W1) of the first system. The processor 410 may determine a failure of the first inverter 600.

The processor 410 may diagnose the current information of the stator windings (U2, V2 and W2) of the second system, detected through the second current sensor 510, and thereby may determine whether a temporary failure or permanent failure such as disconnection or short circuit occurs in the stator windings (U2, V2 and W2) of the second system. The processor 410 may determine a failure of the second inverter 610.

The processor 410 may control operations of the first inverter 600 and/or the second inverter 610.

The processor 410 may operate the motor 221 by outputting a motor command signal to the first inverter 600 to supply the current to the stator windings (U1, V1 and W1) of the first system of the motor 221.

The processor 410 may operate the motor 221 by outputting a motor command signal to the second inverter 610 to supply the current to the stator windings (U2, V2 and W2) of the second system of the motor 221. The motor command signal may include a target pressure requested by a driver and a difference in requested target pressure between a previous driver and a current driver.

The processor 410 may control operations of each electronic valve by outputting a valve command signal to each of the electronic valves of the electronic brake system including the control valves 231, 232, 233 and 234.

FIG. 4 illustrates a failure of a first system of a motor of an electronic brake system according to an embodiment.

Referring to FIG. 4, it is illustrated that, in the motor 221, the stator windings (U1$a$(+), W1$b$(−), V1$b$(+), U1$b$(−), W1$a$(+), V1$a$(−)) of the first system fail, and the stator windings (W2$b$(+), V2$b$(−), U2$b$(+), W2$a$(−), V2$a$(+), U2$a$(−)) of the second system are normal.

When the first system fails, the processor 410 may operate the motor 221 by supplying current to the stator windings (W2$b$(+), V2$b$(−), U2$b$(+), W2$a$(−), V2$a$(+), U2$a$(−)) of the second system through the second inverter 610. That is, the current may be supplied to only the stator windings (W2$b$(+), V2$b$(−), U2$b$(+), W2$a$(−), V2$a$(+), U2$a$(−)) of the second system which is normal, without supplying the current to the stator windings (U1$a$(+), W1$b$(−), V1$b$(+), U1$b$(−), W1$a$(+), V1$a$(−)) of the first system which is malfunctioning. Accordingly, the rotor 701 of the motor 221 may be rotated only by the stator windings (W2$b$(+), V2$b$(−), U2$b$(+), W2$a$(−), V2$a$(+), U2$a$(−)) of the second system.

FIG. 5 illustrates a failure of a second system of a motor of an electronic brake system according to an embodiment.

Referring to FIG. 5, it is illustrated that, in the motor 221, the stator windings (U1$a$(+), W1$b$(−), V1$b$(+), U1$b$(−), W1$a$(+), V1$a$(−)) of the first system are normal, and the stator windings (W2$b$(+), V2$b$(−), U2$b$(+), W2$a$(−), V2$a$(+), U2$a$(−)) of the second system fail.

When the second system fails, the processor 410 may operate the motor 221 by supplying current to the stator windings (U1$a$(+), W1$b$(−), V1$b$(+), U1$b$(−), W1$a$(+), V1$a$(−)) of the first system through the first inverter 600. That is, the current may be supplied to only the stator windings (U1$a$(+), W1$b$(−), V1$b$(+), U1$b$(−), W1$a$(+), V1$a$(−)) of the first system which is normal, without supplying the current to the stator windings (W2$b$(+), V2$b$(−), U2$b$(+), W2$a$(−), V2$a$(+), U2$a$(−)) of the second system which is malfunctioning. Accordingly, the rotor 701 of the motor 221 may be rotated only by the stator windings (U1$a$(+), W1$b$(−), V1$b$(+), U1$b$(−), W1$a$(+), V1$a$(−)) of the first system.

As described above, because the motor includes two independent systems, the first system and the second system cooperate to rotate the rotor in a normal state, and when one of the two systems fails, the rotor may be rotated only the stator windings of the other system. Accordingly, even when one of the systems fails, the other system may continue to function, and thus the motor may be continuously driven by reducing a motor performance without stopping the motor.

However, when one of the systems fails, the motor performance may be reduced in half because the motor is required to be driven using only the normal system. To achieve a similar level of performance as before the motor failure even in the above-described state, more current is required to be supplied to the stator windings of normal system, causing an excessive motor heat. Conventionally, a larger size motor has been designed considering a failure of one system to prevent the above, but a large motor may lead to a difficulty in packaging and integration with an existing motor.

According to an embodiment, when one of the systems of the motor 221 fails during braking control, the electronic brake system may drive the motor 221 by using only the normal system, and increase a hydraulic pressure discharged from the first pressure chamber 212 or the second pressure chamber 213 by communicating the first pressure chamber 212 and the second pressure chamber 213. Accordingly, a deterioration of the motor performance due to a failure of one of the systems of the motor may be compensated for by increasing the hydraulic pressure discharged from the pressure chamber, and thereby may stably secure a braking performance of system. The first pressure chamber 212 and the second pressure chamber 213 may communicate with each other by opening control valves provided on a flow path connecting the first pressure chamber 212 and the second pressure chamber 213. By transferring a portion of the hydraulic pressure discharged from the first pressure chamber 212 to the second pressure chamber 213 to be used to push the hydraulic piston 214, the hydraulic pressure discharged from the first pressure chamber 212 may be increased. Also, by transferring a portion of the hydraulic pressure discharged from the second pressure chamber 213 to the first pressure chamber 212 to be used to push the hydraulic piston 214, the hydraulic pressure discharged from the second pressure chamber 213 may be increased.

FIG. 6 illustrates a state where an electronic brake system according to an embodiment performs a normal braking mode.

Once a driver operates the brake pedal 100, the controller 400 may operate the hydraulic pressure supply device 200 depending on a displacement of the brake pedal 100.

The controller 400 may open the first control valve 231 and the second control valve 232, and drive the motor 221 by supplying current to stator windings (U1a(+), W1b(−), V1b(+), U1b(−), W1a(+), V1a(−)) of the first system through the first inverter 600 and supplying current to the stator windings (W2b(+), V2b(−), U2b(+), W2a(−), V2a(+), U2a(−)) of the second system through the second inverter 610. As such, the controller 400 may perform a normal braking mode that opens the first control valve 231 and the second control valve 232 and drives the motor 221. The third control valve 233 may be in a closed state in the normal braking mode. That is, the first pressure chamber 212 and the second pressure chamber 213 may not communicate with each other in the normal braking mode.

As the controller 400 performs the normal braking mode, the hydraulic piston 214 is moved by an operation of the motor 221, generating a hydraulic pressure in the first pressure chamber 212. The hydraulic pressure discharged from the first pressure chamber 212 may be transferred to the first hydraulic circuit 310 and the second hydraulic circuit 320 of the hydraulic control unit 300 through the first control valve 231 and the second control valve 232 which are switched to the open state. The hydraulic pressure transferred to the first hydraulic circuit 310 and the second hydraulic circuit 320 may be transferred to each of the wheel cylinders 140 through inlet valves, generating a braking force to each vehicle wheel.

FIG. 7 illustrates a state where an electronic brake system according to an embodiment performs a safe braking mode.

Referring to FIG. 7, when one of the first and second systems of the motor 221 fails during a normal braking mode, the controller 400 may switch the normal braking mode to a safe braking mode to additionally open the third control valve 233, thereby communicating the first pressure chamber 212 and the second pressure chamber 213. In this instance, the fourth control valve 234 may be in a closed state. Accordingly, by transferring a portion of the hydraulic pressure discharged from the first pressure chamber 212 to the second pressure chamber 213 to be used to push the hydraulic piston 214, the hydraulic pressure discharged from the first pressure chamber 212 may be increased.

When one of the systems of the motor fails, a motor performance may be reduced in half because the motor is required to be driven using only the normal system. Accordingly, the hydraulic pressure discharged from the first pressure chamber 212 may be decreased. However, by switching the normal braking mode to the safe braking mode and communicating the first pressure chamber 212 and the second pressure chamber 213, the portion of the hydraulic pressure discharged from the first pressure chamber 212 may be transferred to the second pressure chamber 213 to be used to push the hydraulic piston 214, thereby increasing the hydraulic pressure discharged from the first pressure chamber 212. Accordingly, a deterioration of the motor performance due to a failure of one of the systems of the motor may be compensated for by increasing the hydraulic pressure discharged from the pressure chamber, and thus a similar braking performance as before the motor failure may be stably secured, without supplying more current to stator windings of the normal system.

FIG. 8 illustrates a control method of an electronic brake system according to an embodiment.

Referring to FIG. 8, during braking control, the controller 400 may detect current of the stator windings (U1, V1 and W1) of the first system detected through the first current sensor 500 (800), and also detect current of the stator windings (U2, V2 and W2) of the second system detected through the second current sensor 510 (802).

The controller 400 may determine whether the first system or the second system fails based on information about the detected current (804).

When no failure of the first system or the second system is determined, the controller 400 may maintain a normal braking mode as a braking mode (806). In the normal braking mode, the first control valve 231 and the second control valve 232 are open, the motor 221 is driven, and the third control valve 233 may be in a closed state in order not to communicate the first pressure chamber 212 and the second pressure chamber 213.

On the other hand, when the first system or the second system fails, the controller 400 may switch the normal braking mode to a safe braking mode (808). In the safe braking mode, the third control valve 233 is additionally open in addition to the normal braking mode, and thus the first pressure chamber 212 and the second pressure chamber 213 communicate with each other. In this instance, the fourth control valve 234 may be in a closed state.

As such, when one of the systems of the motor fails, by switching the normal braking mode to the safe braking mode and communicating the first pressure chamber 212 and the second pressure chamber 213, a portion of a hydraulic pressure discharged from the first pressure chamber 212 may be transferred to the second pressure chamber 213 to be used to push the hydraulic piston 214, thereby increasing the hydraulic pressure discharged from the first pressure chamber 212. Accordingly, a deterioration of the motor performance due to a failure of one of the systems of the motor may be compensated for by increasing the hydraulic pressure discharged from the pressure chamber, and thus a similar braking performance as before the motor failure may be stably secured, without supplying more current to stator windings of the normal system.

FIG. 9 is a hydraulic circuit diagram illustrating an electronic brake system according to another embodiment.

Referring to FIG. 9, the hydraulic pressure supply device 200 may include a plurality of control valves 230.

The plurality of control valves 230 may include first to third control valves 235, 236 and 234.

The first and second control valves 235 and 236 may control a flow of a pressurized medium transferred to the hydraulic control unit 300 from the first pressure chamber 212 and/or the second pressure chamber 213 or a flow of the pressurized medium between the first pressure chamber 212 and the second pressure chamber 213, by a formation of flow paths depending on an opening and closing of valves. For example, the first and second control valves 235 and 236 may be provided as a normally closed type solenoid valve that operates to be open when an on-driving signal is received from the controller 400 in a normally closed state.

The third control valve 234 may control a flow of the pressurized medium between the second pressure chamber 213 and the reservoir 130. For example, the third control valve 234 may be provided as a normally open type solenoid valve that operates to be closed when an on-driving signal is received from the controller 400 in a normally open state.

Types and the number of the plurality of control valves 230 may vary depending on a structure of flow paths.

FIG. 10 illustrates a state where an electronic brake system according to another embodiment performs a normal braking mode.

Once a driver operates the brake pedal 100, the controller 400 may operate the hydraulic pressure supply device 200 depending on a displacement of the brake pedal 100.

The controller 400 may open the first control valve 235 and close the second control valve 236. Also, the controller 400 may drive the motor 221 by supplying current to stator windings (U1a(+), W1b(−), V1b(+), U1b(−), W1a(+), V1a(−)) of a first system through the first inverter 600 and supplying current to the stator windings (W2b(+), V2b(−), U2b(+), W2a(−), V2a(+), U2a(−)) of a second system through the second inverter 610. As such, the controller 400 may perform a normal braking mode that drives the motor 221 and closes one of the first control valve 235 and the second control valve 236 (for example, opens the first control valve 235 and closes the second control valve 236). The third control valve 233 may be in a closed state in the normal braking mode. That is, the first pressure chamber 212 and the second pressure chamber 213 may not communicate with each other in the normal braking mode.

As the controller 400 performs the normal braking mode, the hydraulic piston 214 is moved by an operation of the motor 221, generating a hydraulic pressure in the first pressure chamber 212. The hydraulic pressure discharged from the first pressure chamber 212 may be transferred to the first hydraulic circuit 310 and the second hydraulic circuit 320 of the hydraulic control unit 300 by flowing in a direction of an arrow. The hydraulic pressure transferred to the first hydraulic circuit 310 and the second hydraulic circuit 320 may be transferred to each of the wheel cylinders 140 through inlet valves, generating a braking force to each vehicle wheel.

FIG. 11 illustrates a state where an electronic brake system according to another embodiment performs a safe braking mode.

Referring to FIG. 11, when one of the first and second systems of the motor 221 fails during a normal braking mode, the controller 400 may switch the normal braking mode to a safe braking mode that opens both the first control valve 235 and the second control valve 236, thereby communicating the first pressure chamber 212 and the second pressure chamber 213. Accordingly, by transferring a portion of a hydraulic pressure discharged from the first pressure chamber 212 to the second pressure chamber 213 to be used to push the hydraulic piston 214, the hydraulic pressure discharged from the first pressure chamber 212 may be increased.

When one of the systems of the motor fails, a motor performance may be reduced in half because the motor is required to be driven using only the normal system. Accordingly, the hydraulic pressure discharged from the first pressure chamber 212 may be decreased. However, by switching the normal braking mode to the safe braking mode and communicating the first pressure chamber 212 and the second pressure chamber 213, the portion of the hydraulic pressure discharged from the first pressure chamber 212 may be transferred to the second pressure chamber 213 to be used to push the hydraulic piston 214, thereby increasing the hydraulic pressure discharged from the first pressure chamber 212. Accordingly, a deterioration of the motor performance due to a failure of one of the systems of the motor may be compensated for by increasing the hydraulic pressure discharged from the pressure chamber, and thus a similar braking performance as before the motor failure may be stably secured, without supplying more current to stator windings of the normal system.

The invention claimed is:

1. An electronic brake system, comprising:
   a motor comprising a first winding and a second winding;
   a piston coupled to the motor through a power transmission member;
   a cylinder configured to accommodate the piston, and comprising a first chamber and a second chamber partitioned by the piston;
   a flow path coupled to the first chamber and the second chamber;
   a control valve provided on the flow path;
   a first inverter configured to supply a current to the first winding;
   a second inverter configured to supply a current to the second winding; and
   a processor configured to control the first inverter, the second inverter and the control valve, based on an output of a pedal displacement sensor,
   wherein the processor is configured to open the control valve based on identifying a failure of at least one of the first winding, the second winding, the first inverter or the second inverter,
   wherein, when the failure of the at least one of the first winding, the second winding, the first inverter or the second inverter is not identified, the processor is configured to close the control valve.

2. The electronic brake system of claim 1, further comprising:
   a first current sensor configured to detect a current supplied to the first winding; and a second current sensor configured to detect a current supplied to the second winding.

3. The electronic brake system of claim 2, wherein the processor is configured to identify the failure of the at least one of the first winding, the second winding, the first inverter or the second inverter based on an output of the first current sensor and an output of the second current sensor.

4. The electronic brake system of claim 1, wherein the processor is configured to:
control the second inverter to drive the motor based on identifying the failure of at least one of the first winding or the first inverter, and
control the first inverter to drive the motor based on identifying the failure of at least one of the second winding or the second inverter.

5. The electronic brake system of claim 1, wherein the processor is configured to open the control valve so that the first chamber is in fluid communication with the second chamber.

6. The electronic brake system of claim 1, wherein the processor is configured to control the motor so that at least a portion of a hydraulic pressure of the first chamber is provided to the second chamber while the control valve is open.

7. The electronic brake system of claim 1, further comprising:
a first hydraulic circuit configured to control a hydraulic pressure transferred from the first chamber to a first wheel cylinder; and
a second hydraulic circuit configured to control a hydraulic pressure transferred from the first chamber to a second wheel cylinder.

8. The electronic brake system of claim 1, wherein the motor further comprises a stator and a rotor, and
the first winding and the second winding is alternately arranged on the stator.

9. A control method of an electronic brake system comprising a motor comprising a first winding and a second winding, a piston configured to be connected to the motor through a power transmission member, a cylinder configured to accommodate the piston and comprising a first chamber and a second chamber partitioned by the piston, a flow path configured to connect the first chamber and the second chamber, a control valve provided on the flow path, a first inverter configured to supply a current to the first winding; and a second inverter configured to supply a current to the second winding, the control method comprising:
controlling the first inverter, the second inverter and the control valve based on an output of a pedal displacement sensor;
identifying whether at least one of the first winding, the second winding, the first inverter or the second inverter fails; and
opening the control valve based on identifying a failure of the at least one of the first winding, the second winding, the first inverter or the second inverter; and
when the failure of the at least one of the first winding, the second winding the first inverter or the second inverter is not identified, closing the control valve.

10. The control method of claim 9, wherein the identifying of whether the at least one of the first winding, the second winding, the first inverter or the second inverter fails comprises identifying the failure of the at least one of the first winding, the second winding, the first inverter or the second inverter based on a current supplied to the first winding and a current supplied to the second winding.

11. The control method of claim 9, further comprising:
controlling the second inverter to drive the motor based on identifying the failure of at least one of the first winding or the first inverter; and
controlling the first inverter to drive the motor based on identifying the failure of at least one of the second winding or the second inverter.

12. The control method of claim 9, wherein the opening of the control valve comprises opening the control valve so that the first chamber is in fluid communication with the second chamber.

13. The control method of claim 9, further comprising:
controlling at least one of the first inverter or the second inverter so that at least a portion of a hydraulic pressure of the first chamber is provided to the second chamber while the control valve is open.

* * * * *